United States Patent [19]

George

[11] Patent Number: 5,203,015
[45] Date of Patent: Apr. 13, 1993

[54] AUTOMATIC CHANNEL SELECTION IN A MOBILE RADIO FOR TELEHONE INTERCONNECT

[75] Inventor: David L. George, Colleyville, Tex.

[73] Assignee: Uniden America Corporation, Fort Worth, Tex.

[21] Appl. No.: 861,355

[22] Filed: Mar. 30, 1992

Related U.S. Application Data

[63] Continuation of Ser. No. 499,179, Mar. 26, 1990.

[51] Int. Cl.$^5$ .......................... H04Q 9/00; H04B 1/00
[52] U.S. Cl. .................................... 455/34.1; 455/54.2; 455/58.1; 455/186.1
[58] Field of Search ..................... 455/34.1, 17, 58.1, 455/54.2, 186.1, 185.1, 183.2, 77, 62, 166.2

[56] References Cited

U.S. PATENT DOCUMENTS

| | | | |
|---|---|---|---|
| Re. 32,789 | 11/1988 | Lynk, Jr. et al. | 379/58 |
| 3,806,804 | 4/1974 | Mills et al. | 325/55 |
| 4,114,104 | 9/1978 | Denzene | 325/470 |
| 4,179,661 | 12/1979 | Harris et al. | 325/455 |
| 4,347,625 | 8/1982 | Williams | 455/17 |
| 4,360,927 | 11/1982 | Bowen et al. | 455/17 |
| 4,400,585 | 8/1983 | Kaman et al. | 179/2 |
| 4,409,687 | 10/1983 | Berti et al. | 455/7 |
| 4,649,567 | 3/1987 | Childress | 455/17 |
| 4,656,653 | 4/1987 | Oda et al. | 379/61 |
| 4,672,657 | 6/1987 | Dershowitz | 379/63 |
| 4,682,367 | 7/1987 | Childress | 455/17 |
| 4,726,050 | 2/1988 | Menich et al. | 379/60 |
| 4,726,051 | 2/1988 | Schuermann | 379/60 |
| 4,744,101 | 5/1988 | Saegusa | 379/61 |
| 4,747,101 | 5/1988 | Akaiwa et al. | 370/95 |
| 4,768,218 | 8/1988 | Yorita | 379/61 |
| 4,768,220 | 8/1988 | Yoshihara et al. | 379/63 |
| 4,860,337 | 8/1988 | Shimura | 379/63 |
| 4,926,496 | 5/1990 | Cole | 455/77 |
| 5,025,254 | 6/1991 | Hess | 455/34 |

OTHER PUBLICATIONS

Fichaut, New Services for the IRT 1500 Subscriber Connection System, 1985, p. 26.

*Primary Examiner*—Reinhard J. Eisenzopf
*Assistant Examiner*—Christine K. Belzer
*Attorney, Agent, or Firm*—Richards, Medlock & Andrews

[57] ABSTRACT

A mobile radio programmed to analyze idle channel assignments issued by a repeater station and select different channels, if appropriate, which are especially adapted for communicating with other communication facilities, such as a telephone interconnect. Programmed into the mobile radio with each communication channel is an indication of whether or not such channel can be utilized to communicate with the other communication facility. If communications are desired with the other communication facility, and if the present idle channel assigned by the repeater station does not permit such communication, then a processor in the mobile radio consults a data list of appropriate channels, selects one such channel, and then establishes communications to the other communication facility on such channel.

8 Claims, 2 Drawing Sheets

| SYSTEM 1 | SYSTEM 2 | ... | SYSTEM N |
|---|---|---|---|
| 100* | 200 | | 600 |
| 101* | 201 | | 601* |
| 102 | 202* | | 602 |
| | 203* | | 603 |
| | ⋮ | | ⋮ |
| | 218 | | 609 |
| | 219* | | |

| | SYSTEM 1 | ID |
|---|---|---|
| (GROUP 1) | 100* | 001 |
| (GROUP 2) | | 010* |

AUTOMATIC CHANNEL SELECTION IN A MOBILE RADIO FOR TELEHONE INTERCONNECT

RELATED APPLICATION

This is a continuation U.S. patent application Ser. No. 07/499,179 filed Mar. 26, 1990.

FIELD OF THE INVENTION

The present invention relates in general to mobile radios and associated repeater equipment, and more particularly to mobile radio processor circuits, and methods of programming such circuits.

BACKGROUND OF THE INVENTION

Hand-held and mobile two-way radios are extensively utilized for providing communication capabilities between persons having duties necessitating movement from one geographic area to another. In order to increase the geographic area of coverage in which two-way radios can communicate with each other, intermediate receive/transmission equipment is employed. Such equipment is conventionally known as a "repeater" which receives transmissions from one mobile radio on one frequency, and transmits duplicate information to the receiving mobile radio on a different frequency. Such a system is disclosed in U.S. Pat. No. 4,649,567.

The mobile radio systems of the type noted above have been supplemented with many features to make communications easier, as well as to broaden the communication capabilities. One such feature implemented is the capability to communicate with telephones through the public telephone network. Adjunct equipment added to the mobile radio repeater system provides the capability of communications between one or more of the two-way radios and telephone sets switched to the repeater system, via the public telephone network. U.S. Pat. No. 4,649,567 discloses the integration of mobile radio equipment and a telephone interconnect interface providing communications to the public telephone network.

In order to realize efficient utilization of communication channels, systems are often switched, or trunked, so that a few communication channels can be employed to serve a large number of users. The trunking of equipment, such as repeaters, is accomplished by the integral interconnection therebetween so that busy/idle status thereof can be quickly determined to provide newly initiated communication requests with idle channels. However, the addition of telephone interconnect equipment to repeater systems as adjunct equipment cannot be efficiently trunked in a similar manner. Generally, the telephone interconnect equipment comprises a telephone switching system interface which is uniquely associated with a particular repeater. In order to provide users of mobile radios with the ability to communicate via the public telephone network, fewer telephone interconnect interfaces are generally required than repeaters. Hence, some repeaters may be adapted for communicating via the public telephone network, and other repeaters not equipped with the requisite telephone interconnect interfaces cannot communicate with the public telephone network.

Heretofore, the users of mobile radios were required to manually select specific radio channels of repeater systems in order to attempt communications with the public telephone network. Numerous disadvantages result from such an arrangement, such disadvantages being described below.

It can be seen from the foregoing that a need exists for an improved two-way radio which facilitates communications to telephone sets by way of the public telephone network.

SUMMARY OF THE INVENTION

In accordance with the present invention, the disclosed mobile radio and method of controlling thereof substantially reduce or eliminate the disadvantages and shortcomings associated with the prior art radios. According to the invention, the mobile radio is programmed to identify those channels which are capable of communicating by way of the telephone interconnect interface with the public telephone network. When a request for service is made by a user of the mobile radio to communicate with the public telephone network, a processor in the mobile radio can correlate the idle channels, and select therefrom a channel adapted for communicating with the public telephone network. Such selection is automatic, and no decision-making capability is required on the part of the user of the mobile radio.

In accordance with the preferred embodiment of the invention, the mobile radio processor is programmed with a data base or table which identifies all communication channels, and flags those channels adapted for communicating with the public telephone network. The mobile radio is further programmed to identify calls to telephone sets of the public network, and determine if a home channel is available. If a home channel is not available, then another channel is selected which is presently available for communications. Next, the processor determines whether the selected channel is flagged and thus adapted for communicating with the public telephone network. If an affirmative determination results, then the radio switches to such channel and establishes communications, via the repeater system and telephone interconnect interface, with the public telephone network. If, on the other hand, the selected channel is not flagged, then the processor selects another idle, flagged channel and proceeds to establish communications thereon with the public telephone network.

In accordance with other features of the invention, the flagging of communication channels can be carried out with regard to "System" and "Group" lists which are maintained in the memory of the mobile radio.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or elements throughout the views, and in which.

DETAILED DESCRIPTION OF THE INVENTION

Figures 1, 3, 5:
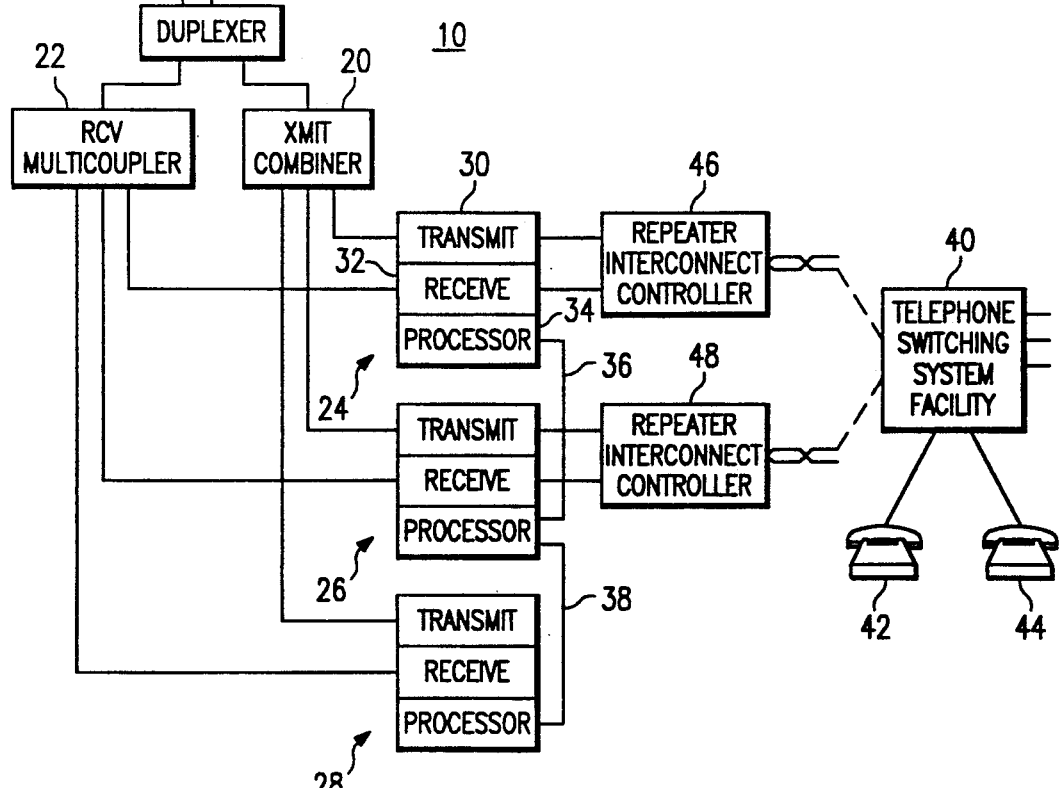
FIG. 1 is a generalized block diagram of a mobile radio system, including a repeater system and interconnect controller interfaces for providing communications to the public telephone network.
FIG. 3 depicts a data base stored in each mobile radio of the invention for identifying communication channels adapted for communicating with the public telephone network.
FIG. 5 depicts a table of data stored in the memory of the mobile radio for identifying various predefined groups having the capability of communicating with the public telephone network.

FIG. 1 is illustrative of an environment in which the principles and concepts of the invention can be advantageously practiced. Shown is a multichannel repeater communication system 10 which provides for two-way communications between remote radios, such as a hand-held mobile radio 12 and a similar radio 14. In practice, many such mobile radio pairs can communicate simultaneously on different channels. While the radios shown are of the hand-held type, the repeater system 10 may be adapted for communicating with remote base stations, and other types of radios. The mobile radios 12 and 14 are each capable of, for example, initiating a communication with the repeater system 10, which system then retransmits the intelligence at a higher power so that it can be received by the other remote mobile radio. In response, the remote mobile radio 14 answers by transmitting a response to the repeater system 10, which system then retransmits the response to the originating mobile radio 12. In this manner, two-way communications can be carried on between the persons controlling the mobile radios 12 and 14. As is well known in the art, each transmission by the mobile radios 12 and 14 can utilize different radio communication channels and equipment of the repeater system 10.

As can be appreciated, numerous such mobile radios can be employed with a single repeater system 10 so that multiple persons can communicate with each other on a single channel, or with others on other channels. Typical repeater systems include about ten channels. In addition, mobile radios are commercially available for communicating through different repeater systems.

Radio communications of the type noted are highly advantageous for use by law enforcement agents, fire departments, security persons and other service industries in which remotely located persons desire to communicate with each other. Because of the power transmitting constraints placed on the mobile radios 12 and 14 themselves by governmental regulatory agencies, such radios cannot often communicate directly with each other, but rather require the use of the repeater system 10 to increase the area of coverage in which the mobile radios 12 and 14 can communicate with each other. In view of the high frequencies allocated for radio communication of this type, i.e., 806 Mhz-871 Mhz, the repeater system 10 includes a transmit/receive antenna 16 located at a point of high geographical elevation so that line of sight transmission is extended, as is the area of coverage for communications between the mobile radios 12 and 14.

The repeater system 10 is preferably of the type in which transmit and receive information can be simultaneously transmitted and received by the antenna 16. To that end, a duplexer 18 allows both transmit and receive equipment of the repeater system 10 to utilize the antenna 16 for transmit and receive capabilities. The system side input to the duplexer 18 is connected to a transmit combiner 20 as well as to a receive multicoupler 22. The transmit combiner receives information from a number of repeaters, designated by reference characters 24, 26 and 28. Each repeater is uniquely associated with a communication channel. Thus, three channels are shown for purposes of example. In like manner, the receive multicoupler 22 provides communication intelligence from the antenna 16 to each repeater 24-28. Each repeater 24-28 is preferably of the same type, and in the preferred form of the invention, is a model MRS 804 or model MRS 904, obtainable from Uniden America Corporation. The repeater, for example repeater 24, includes a transmit section 30 for transmitting communication information on a specified channel frequency via the transmit combiner 20 and the antenna 16. A receiver section 32 of the repeater 24 receives communication information via the antenna 16 and the receive multicoupler 22. The transmit and receive frequencies are slightly different to prevent interference. Otherwise, a receiving mobile radio would receive two interfering signals, one from the repeater system 10, and the other from the transmitting mobile radio. Also, since the repeater transmitter and receiver must operate simultaneously (dUPLEX), different frequencies must be used.

Internal communications between the receive section 32 and the transmit section 30 of the repeater 24 allow information received by the antenna 16 to be retransmitted via the transmit section 30, at a higher power. A processor section 34 of the repeater 24 is programmed to coordinate the functions between the receiver section 32 and the transmit section 30, and to maintain a status of the repeater 24. The repeater status is coupled to the other repeaters 26 and 28 via high speed data lines 36 and 38. In this manner, the busy/idle status of each repeater 24-28 can be communicated to the other repeaters to provide full trunking capabilities of the repeater system 10. As is well known in the art, the repeater system 10 can switch between busy and idle repeaters 24-28 so that a large number of mobile radio users can be accommodated by a smaller number of repeaters 24-28. Such a system is of the trunking type.

The foregoing description of FIG. 1 depicts conventional radio equipment well known in the art. More recently, there has been provided additional circuits and apparatus for providing communications of mobile radios 12 and 14 to remote telephone sets 42 and 44 by way of a public telephone communication switching system facility, designated by numeral 40. Communications between the repeater system 10 and the telephone switching system facility 40 are carried out with one or more repeater interconnect controllers, 46 and 48. The telephone lines connecting the interconnect controllers 46 and 48 to the telephone switching system facility 40 are generally telephone subscriber lines having assigned director numbers. In the preferred embodiment of the invention, the repeater interconnect controllers 46 and 48 are of the model ARX-780, also obtainable from Uniden America Corporation. While voice communications of the repeater system 10 to the telephone switching system 40 is described, communications of data or other information can be carried out to other remote facilities by other types of interconnect controllers connected to one or more of the repeaters 24-28. Thus, while the remote telephone switching system 40 is shown as one type of remote communication facility, many other types of facilities are contemplated by the invention.

Generally, a major portion of communications with one mobile radio 12 is carried out with another mobile radio 14, or a base station (not shown). Hence, fewer repeater interconnect controllers 46 and 48 are required, as compared to the number of repeaters 24-28. Such a configuration maximizes the economy of the system, but with certain disadvantages. One disadvantage, as is apparent in FIG. 1, is that if mobile radio 12 has been currently assigned repeater 28 for the channel on which to operate, and communications are desired with a telephone set 42, such interconnection is not possible, since repeater 28 is not associated with a repeater interconnect controller, such as 46 or 48. To circumvent such problem, the mobile radios 12 and 14 themselves have been traditionally modified so as to be manually switchable to operate with repeaters 24 and 26 which have the capability of communicating with telephone sets 42 or 44. With such a modification to the mobile radios 12 and 14, communications with telephones 42 and 44 were made possible, but the number of systems which each such mobile radio could accommodate were decreased by about 50%. As used herein, a system is synonymous with a repeater system. Thus, if a mobile radio were constructed to operate with ten different repeater systems, and each system has capabilities of communications with a telephone system, then the user could only switch between five telephone-equipped repeater systems and five channels of non-telephone-equipped repeater systems.

The general operation of the communications system shown in FIG. 1 is carried out as follows. Each mobile radio 12 includes processor-controlled circuitry which is adapted for communicating on any of a predefined number of transmit and receive channels. One such channel is designated a "home" channel which the processor constantly monitors to receive or transmit nonverbal information, such as data, to the repeater system 10. The repeater system 10 maintains the busy/idle status each repeater 24-28 and continuously transmits such information to each mobile radio 12 and 14, even during voice conversations. Of course, the users of the mobile radios 12 and 14 cannot hear such data communications. Thus, when communications by a mobile radio 12 and 14 is desired, idle channel information is received from the repeater system 10 on the home channel, but actual communications will commence on an idle channel. Indeed, the idle channel can be the home channel itself. As noted above, both voice communications as well as data communications can be carried on simultaneously, without interference therebetween. In this manner, a person can utilize the mobile radio 12 for voice communications to communicate with another person having similar equipment, while at the same time the repeater system 10 can be transmitting data concerning busy/idle status to each mobile radio. In the past, if a person having a hand-held mobile radio 12 desired communications with a telephone set 42, such person would be required to manually switch to the system position of the mobile radio 12, which system is known by the user to communicate only on channels associated with repeater interconnect controllers 46 and 48 to thereby be interconnected with a telephone 42.

In accordance with an important feature of the invention, the mobile radios 12 and 14 are programmed with decision-making capabilities to automatically select communication channels for communicating with telephone sets 42 and 44. Therefore, when mobile radio and telephone set communications are desired, appropriate channels can be automatically selected by the mobile radio 12 or 14, even though the repeater system 10 has indicated a preference of other idle, but inappropriate channels.

Figure 2:
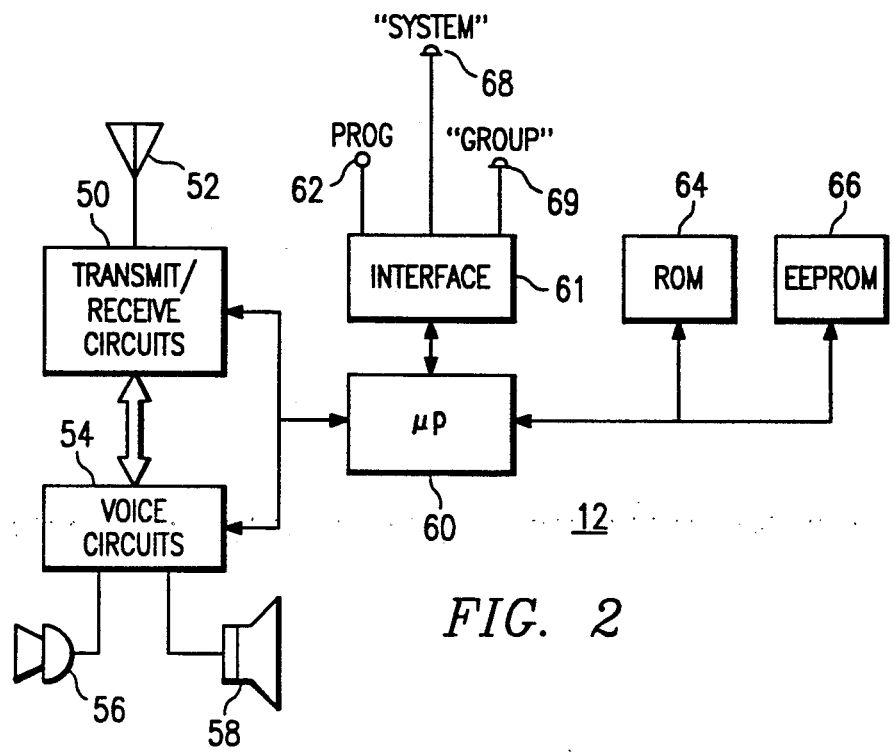
FIG. 2 is a generalized block diagram of the operational circuits of a mobile radio for carrying out the present invention.

FIG. 2 illustrates the generalized circuits of the mobile radios 12 and 14 of the invention. Such circuits include transmit and receive circuits 50 for communicating intelligence and data over one or more channels, via an antenna 52. Voice circuits 54 are connected to a microphone 56 and a speaker 58 for the input and the reproducing of voice signals. A microprocessor 60 is connected to the circuits 50 and 54 to coordinate the transmitting and receiving of voice signals. In addition, the microprocessor 60 receives channel assignment data and other data signals from the repeater system 10 via the transmit/receive circuits 50. The microprocessor 60 can be externally programmed by a programming connector 62, via an interface circuit 61. In addition, a "System" switch and a "Group" switch are coupled to the microprocessor 60 by way of the interface 61. The operating program by which the microprocessor 60 carries out transmit and receive functions is permanently stored in a read only memory (ROM) 64. Other data which is occasionally changed is stored in an electrically erasable programmable read only memory (EEPROM) 66. The contents of the EEPROM 66 can be modified during remote programming of the microprocessor 60. It is well known by those skilled in this art the manner in which the microprocessor 60 is programmed such that the mobile radio 12 can carry out basic transmit and receive operations.

FIG. 3 illustrates a data base structure programmed into mobile radios 12 and 14 of the invention to allow automatic selection of appropriate radio channels. In contrast with prior mobile radios having communication capabilities with telephone sets 42, but in which the number of selectable stations were reduced by about 50%, the mobile radios 12 of the invention do not force a limitation on the number of systems because of the adaption thereof for communicating with other communication facilities, such as the public telephone system. While the number of systems usable by the mobile radio 12 is normally about ten, such number of systems is not limited by the invention, as shown in FIG. 2. The mobile radio 12 of the invention has circuits which are programmable to specify in advance the particular channels which are allocated to the predefined systems. As noted above, each system is associated with a repeater system 10, such as shown in FIG. 1. Also, the selection of the system with which to operate is carried out by depressing the "System" switch 68. While not shown, the mobile radio 12 includes a digital readout of the selected system as well as the selected group within the system. Mobile radios of the type well adapted for use with the present invention are of the type SPS 310T/320TS, obtainable from Uniden America Corporation.

Hence, each mobile radio 12, being adapted for use with a number of systems, can be utilized with similar repeater systems which are located in different geographic areas. For purposes of illustration, System 1 shown in FIG. 3 corresponds to the repeater system 10 of FIG. 1. Moreover, channel 100 is associated with repeater 24, channel 101 is associated with repeater 26 and channel 102 is associated with repeater 28. As is also apparent, channels 100 and 101 are provided with capabilities for communicating with other communication facilities, namely a telephone switching system 40 and associated telephone sets 42 and 44. In programming the mobile radio 12 with the data base shown in FIG. 3, channel 100 and 101 associated with System 1 would be flagged with binary data indicating such channels have communication capabilities for communicating with the telephone switching system facility 40. Channel 102 is not so flagged, thus indicating that if communications are desired with the telephone switching system facility 40, channel 102 should not be employed. The flagging in software of channels 100 and 101 may be carried out in numerous different manners, including programming in a software field associated with channel 100, a binary 1, while programming in the corresponding field of channel 102 a binary 0. The coding of the data base with respect to channel 100 and 102 can be carried out in the converse manner noted above. Since there are only three repeaters which define the repeater system 10, only three channels are programmed with respect to the System 1 portion of the data base.

The mobile radio 12 is then programmed to accommodate another system, namely System 2. The repeater system defined by System 2 includes twenty repeaters designated by channels 200-219. As noted in FIG. 3, channels 202, 203 and 219 are associated with repeater interconnect controllers and thus are capable of communicating with other communication facilities, such as the telephone switching system facility 40. Channels 202, 203 and 219 are flagged with such capabilities. All systems with which the mobile radio 12 is capable of communicating are programmed in the data base of FIG. 3, in like manner. With such an arrangement, when the user of a mobile radio 12 of the invention is operating with respect to a desired system, the processor has available information for automatic selection of the channels which are usable for communicating with the communication facility 40, irrespective of idle channels specified for communication by the repeater system 10. Such mobile radios are externally connectable to programming apparatus for defining the various systems and associated communication channels.

Figure 4:
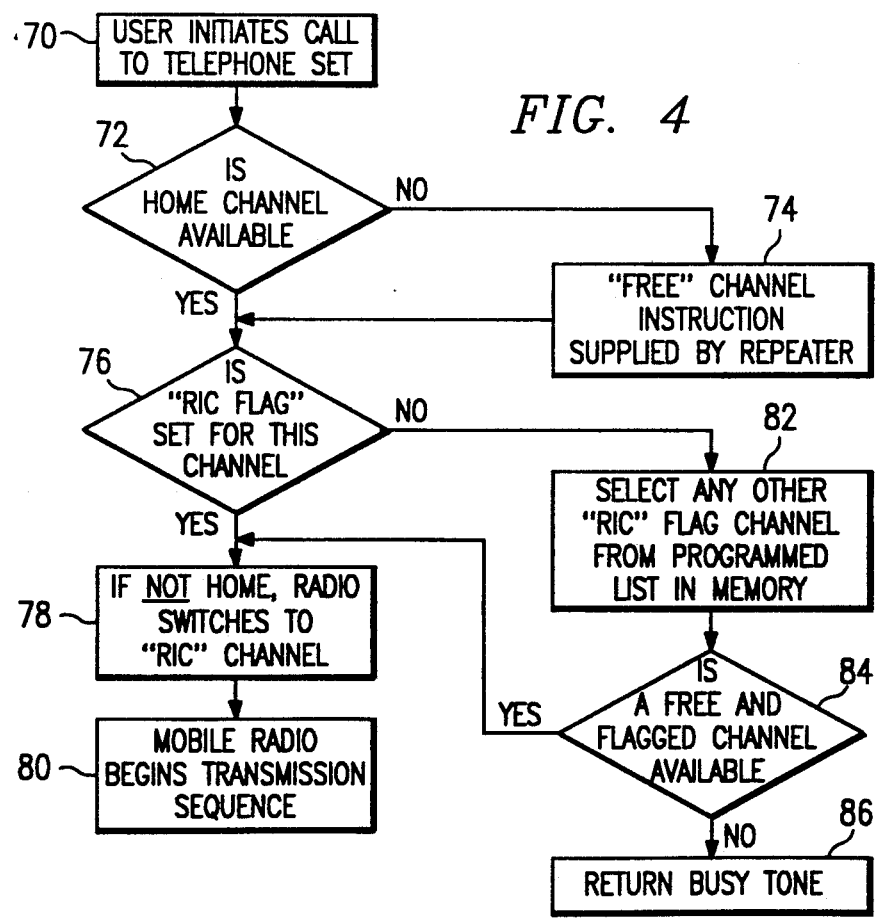
FIG. 4 is a flow chart which illustrates the steps carried out by the processor-controlled mobile radio for automatically selecting communication channels.

FIG. 4 illustrates a portion of the program of the mobile radio 12 for carrying out the feature of the invention in which channels are automatically selected, irrespective of idle channel assignments made by the repeater system 10 for communicating with the communication facility 40. The software instructions for carrying out the functions of FIG. 4 can be a part of the main microprocessor program, or can be a subroutine thereof. Mobile radios can be modified to incorporate the invention by either externally programming the memories of the electrical circuits, or by changing the memory chips with different preprogrammed devices. The illustrated flow chart includes instructions which define step 70 in which the initiation of a call by a user of the mobile radio 12 is detected. In the example, the call is to a subscriber telephone set 42, via the public telephone system 40. Such a step can be accomplished by the microprocessor 60 monitoring the selection by the Group switch 69 of the mobile radio 12. According to decision block 72, the microprocessor 60 determines whether or not the home channel is available. If no audio communications are currently being carried by the home channel, then such channel is available. Otherwise, the home channel is busy and another channel must be found. The busy/idle status of the various channels associated with the repeater system 10 is continually communicated to each mobile radio.

In the event the home channel is not available, the microprocessor 60 proceeds from decision block 72 to instruction step 74 where a free channel is selected. Once an available channel is selected, the microprocessor 60 proceeds to step 76 to carry out instructions to determine whether or not a "RIC" flag is set for the selected channel. The acronym "RIC" connotes a Repeater Interconnect Controller which, when the flag is set, indicates that such a controller is provided with a particular repeater and thus the selected channel. In determining whether or not a RIC flag is set for the selected channel, the data base of the mobile radio shown in FIG. 3 is consulted. When the mobile radio is manually switched to operate with System 1, channels 100 and 101 are flagged as being associated with repeater interconnect controllers 46, and thus are capable of communicating with the telephone switching system facility 40. If the free or idle channel identified by the repeater system 10 is designated in the mobile radio data base as having the RIC flag set, then control of the microprocessor 60 proceeds to step 78. According to the instructions of step 78, if the free channel is not the home channel, then the microprocessor 60 causes the transmit/receive circuits 50 to switch to the selected RIC channel. Once the flagged channel is selected, the mobile radio 12 begins transmission of voice communications to the repeater station 10, and therefrom to the communication facility 40 such that a conversation can be carried out with the designated telephone set 42 or 44. The instructions corresponding to this function are represented by flow chart step 80. It should be understood that the foregoing steps are carried out very rapidly by the microprocessor 60. Indeed, between the time the push-to-talk switch of the mobile radio 12 is pushed and the user begins talking, the steps of the flow chart are carried out. It should be noted that non-telephone interconnect type of communications are carried out in the traditional manner, but for purposes of brevity, such programmed steps are not shown.

With reference back to program flow step 76, if the free channel currently selected by the repeater system 10 is not flagged as being capable for communicating with the telephone switching system facility 40, then program flow branches to step 82. Here, the microprocessor 60 consults the data base of FIG. 3 to select a channel flagged and thus adapted for communicating with the telephone switching system facility 40. The instructions associated with steps 82 and 84 may include various comparison steps to compare sequentially flagged channels with idle channels to find a channel that is both flagged and idle. Once the appropriate channel is selected according to step 82, the program flow branches back to step 78 where the microprocessor 60 continues call processing as noted above. In the event no flagged and idle channel is available, a busy tone is returned to the user of the mobile radio in step 86.

In the preferred form, each mobile radio 12 of the invention includes a system switch (FIG. 2), which when depressed, is capable of successively selecting one of ten systems. Each such system is uniquely associated with a different repeater system 10, and thus is capable of reaching ten different geographic areas in which the respective repeater systems are located. This wide area coverage capability is available, despite that there is also available in the mobile radio of the invention the capabilities for selecting communication with a remote or different communication facility, such as the telephone system noted above. However, and according to the invention, the selection of the channel for which communications with the other communication facility 40 is selected, is carried out automatically under program control of the mobile radio processor 60.

In addition to a manual operated system switch 68 for selecting different repeater systems, the mobile radio 12 further includes an additional manually-operated switch 69 for selecting groups of users within each such system. Such switch 69 is termed a "Group" switch. There can be a wide variety of selectable groups per system, each group having a different identification code. Also, there can be up to 256 identification codes per channel. The group code is continuously transmitted, in a data stream with other data, while the voice information is being transmitted on the same channel. Operation of the group switch 69 does not change the system on which the mobile radio 12 is presently operating, but rather changes the identification code transmitted by the mobile radio 12. By assigning one or more groups to each system, communication capabilities are provided in which only certain mobile radios in one repeater system 10 can communicate only with certain other mobile radios in the same system. For example, maintenance personnel equipped with the mobile radio of the invention and assigned to a particular group can only talk to each other, and cannot talk to other groups in the system. The provision of the assignment of a number of groups per system, and the use of a "Group" switch 69, is well known in the art.

According to another feature of the invention, the mobile radio 12 can be programmed with regard to group designations to identify predefined groups which can communicate with the remote communication facility 40, and those which cannot communicate with such facility 40.

FIG. 5 illustrates identification codes transmitted in the data stream of the channel during voice conversations. A Group 1 code, designated as binary 001, indicates that personnel using mobile radios 12 and 14 assigned to this group code cannot complete radio communications to telephone sets 42 and 44, via the telephone switching system facility 40. On the other hand, radio channels assigned a Group 2 code, binary code 010, are programmed with the capability of communicating to telephone sets 42 and 44. Importantly, the group 2 identification code, 010, is flagged, as noted by the asterisk, so that the microprocessor can automatically detect whether or not various identification codes should be provided with the capability of communicating with the telephone sets 42. The group codes and associated data indicating flagging thereof are also stored in the EEPROM 66.

In accordance with another significant feature of the invention, the hardware or electrical circuits of neither the mobile radios 12 and 14 nor the repeaters system 10 need alternation in order to implement the invention. Rather, the mobile radios 12 can be reprogrammed to carry out the functions noted above. Another technical advantage presented by the invention is that if communications are desired with a different communication facility, the communication channel can be established without attempting or testing communication channels which are incapable of reaching the communication facility. Yet another technical advantage of the invention is that it can be incorporated by programming the mobile radio itself with decision-making capabilities for determining appropriate channels applicable to communications with specified communication facilities and may even override idle channels assigned by the repeater system.

Yet another technical advantage is realized over other types of mobile radios which employ a scanning technique to determine when there is a need to service an incoming call. In the scanning type mobile radio system, each mobile radio must scan each system for service requests, and when the systems are broken down into telephone interconnect and non-telephone interconnect systems, as was conventionally done, not only are the number of accessible systems reduced, but also the chances of missing an incoming request are increased. Scanning type radio systems employing the invention can obviate such shortcomings.

While the preferred embodiment of the invention has been disclosed with reference to a specific mobile radio, and method of programming thereof, it is to be understood that many changes in detail may be made as a matter of engineering choices without departing from the spirit and scope of the invention, as defined by the appended claims.

What is claimed is:

1. In a mobile radio of the type adapted for operation with a multichannel repeater system that coordinates communications between plural mobile radios, and that coordinates communications with at least one different communication facility only on selected ones of said channels, the improvement in said mobile radio comprising:

a processor in said mobile radio;

a memory programmable with data for indicating the channels in said repeater system on which communications are available with said different communication facility;

said processor being programmed to determine if free channel designations transmitted to the mobile radio by said repeater system correspond with communication requests input into the mobile radio by a user to communicate with the communication facility, and on an affirmative determination of a correspondence between a free channel designation and a communication request by the user, said processor causes a transmission to the repeater system on said corresponding free channel; and on a determination of noncorrespondence between a free channel designation and a communication request by the user, said processor selects a channel indicated by the memory data as being available and on which communications can be established to the communication facility;

whereby said mobile radio automatically selects channels that are both free and adapted for communicating with the communication facility.

2. The improved mobile radio of claim 1, wherein said processor operates with a memory having stored therein a designation of channels on which communications are available with the communication facility.

3. The improved mobile radio of claim 2, wherein said memory stores flag data information associated with each said channel that is capable of communicating with the communication facility.

4. The improved mobile radio of claim 1, wherein said mobile radio is adapted for operating with different said repeater systems, and wherein said memory includes stored therein the channels associated with each different said repeater system and a designation of each said channel capable of communicating with a respective communication facility.

5. The improved mobile radio of claim 1, wherein said mobile radio is adapted for operating with different groups of other mobile radios, and wherein said memory includes stored therein in association with each said group, a designation of which channels are capable of communicating with the communication facility.

6. The improved mobile radio of claim 1, wherein said communication facility comprises a public telephone network.

7. The improved mobile radio of claim 1, wherein the communication facility comprises a data network.

8. In a mobile radio of the type adapted for operation with a multichannel repeater system that coordinates communications between plural mobile radios, and that coordinates communication with at least one different communication facility only on selected ones of said channels, the improvement in said mobile radio comprising:

means for identifying a number of channels usable with the repeater system;

means for identifying a number of groups associated with the repeater system;

a microprocessor;

a memory preprogrammed with data indicating which communication channels within said repeater system are adapted for initiation of communications from the mobile radio to the communication facility, said memory being updatable by the repeater system for indicating which channels are idle;

a program stored in said mobile radio and carried out by said microprocessor for sensing requests by a mobile radio user to communicate with the communication facility, and for selecting idle channels available within said repeater system, and for establishing communications on a selected idle communication channel that can also communicate with the communication facility;

said memory being preprogrammed with data indicating which groups within said repeater system are adapted for initiation of communications from the mobile radio to the communication facility; and said program stored in said mobile radio and carried out by said microprocessor for sensing requests by a mobile radio user to initiate communications with respect to said groups, and for determining whether a requested group is indicated as being adapted for communicating with the communication facility, and if the indication is affirmative, said microprocessor establishes communications on a selected idle communication channel for the requested group for communicating with the communication facility.

* * * * *